G. A. LUTZ.
MEANS FOR HOLDING RECEPTACLES AND THE LIKE TO CONDUITS.
APPLICATION FILED FEB. 23, 1907.

917,326.

Patented Apr. 6, 1909.

Witnesses:

Inventor
Geo. A. Lutz.
By his Attorney
T. P. Bourne

UNITED STATES PATENT OFFICE.

GEORGE A. LUTZ, OF NEW YORK, N. Y.

MEANS FOR HOLDING RECEPTACLES AND THE LIKE TO CONDUITS.

No. 917,326.   Specification of Letters Patent.   Patented April 6, 1909.

Application filed February 23, 1907. Serial No. 359,006.

*To all whom it may concern:*

Be it known that I, GEORGE A. LUTZ, a citizen of the United States, and resident of New York city, borough of Brooklyn, New York, have invented certain new and useful Improvements in Means for Holding Receptacles and the Like to Conduits, of which the following is a specification.

My invention relates to improvements in the class of device shown in Letters Patent granted to me October 30, 1906, No. 834,829, for improvements in means for holding receptacles and the like to conduits. In said patent the cap or analogous fitting is mounted over a conduit that has a removable or sliding cover, and the cap is held in place by means of a lip projecting outwardly therefrom engaging the cover to retain the cap in place upon the conduit, the arrangement being such that the cover has to be moved to hold or release the cap. In some positions of use, however, it is desirable to remove the cap without moving the cover of the conduit, and the object of my present invention is to provide means whereby the cap may readily be detached from the cover and conduit and be applied thereto without disturbing the position of the cover of the conduit. To this end I provide a suitable part of the cap with one or more slots extending in the general direction of the conduit and beneath such slot or slots I apply a strip or strips, in the nature of a lip or projection, and through said slot or slots I pass a screw or screws which engage a threaded hole in the strip or lip, whereby the latter and its screw may be slid lengthwise of the conduit into alinement with the under side of the cover of the conduit. By this means and without moving the cover or covers of the conduit the cap may be placed in position and the strip or lip be projected outwardly from the cap under the cover and then secured by the screw for retaining the cap upon the conduit, and the screw and the strip or lip may likewise be slid back under the cap to release the cap from the cover.

Figure 1:
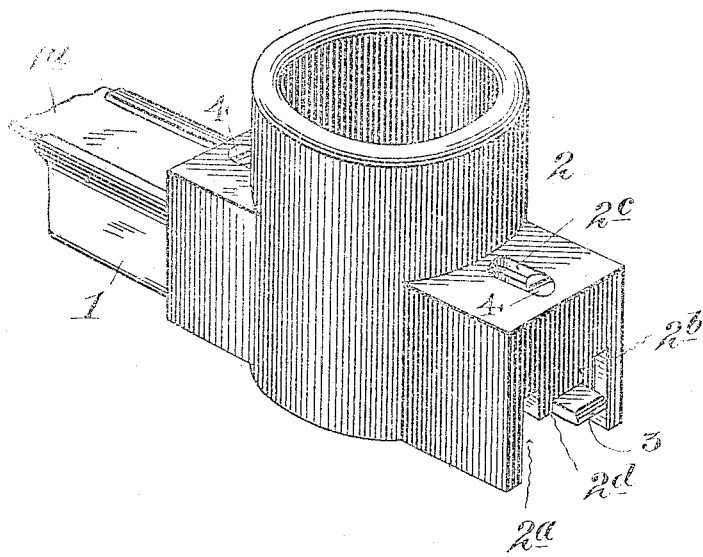
Figure 2:
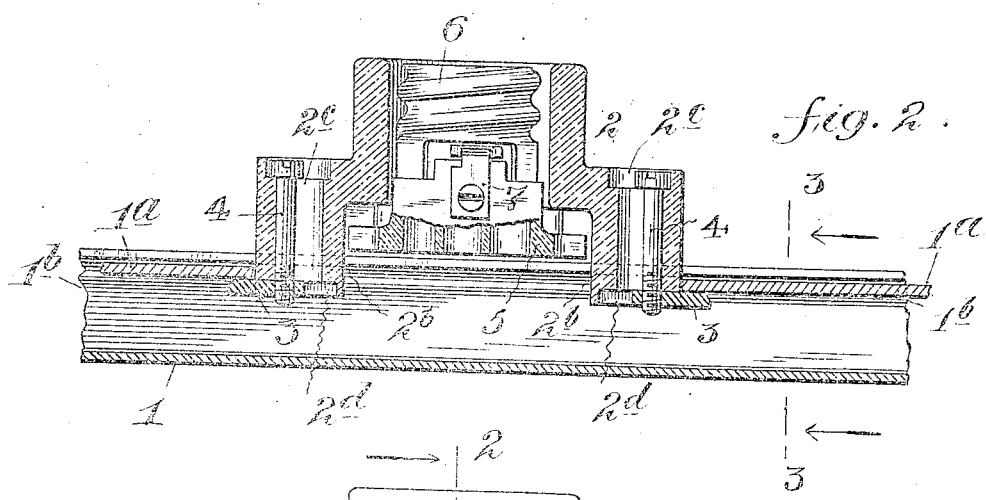
Figure 3:
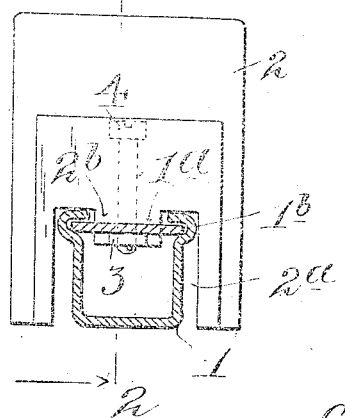

Reference is to be had to the accompanying drawings forming part hereof, wherein, Figure 1 is a perspective view of a cap provided with my improvements, shown in connection with a conduit, Fig. 2 is a central section thereof, substantially on the line 2, 2, in Fig. 3, and Fig. 3 is a cross section on the line 3, 3, in Fig. 2.

In the accompanying drawings the numeral 1 indicates a suitable conduit of the class having one side open and provided with a removable cover or covers $1^a$, shown fitting in grooved portions $1^b$ in the side wall of the conduit, and a suitable cap or receptacle is indicated at 2, and which fits over or upon the conduit, the cap being shown provided with a gain or recess $2^a$ on its under side receiving the conduit. The cap is shown having lugs or projections $2^b$ at its ends projecting into the conduit in line with the corresponding cover $1^a$, whereby the movement of the cover in the conduit is limited by reason of said projections, which thereby serve as stops.

At one or both ends of the cap or receptacle 2 the same is provided with slots $2^c$, shown elongated or extended in the general direction of the conduit, and beneath said slots are strips 3, in the nature of lips or projections, adjustably held in place by screws 4 that pass through the slots $2^c$ and screw into suitable threaded apertures in said lips. The lugs or projections $2^b$ are shown provided on their under surfaces with sockets or recesses $2^d$ in which the strips 3 are located to keep them from turning when the screws 4 are turned, whereby said lips are maintained projecting in the general direction of the conduit and toward the cover $1^a$.

The cap or fitting 2 may be made of insulating material, such as porcelain, and the lips or strips 3 may be made of metal. The length of the strips or lips 3 projecting outwardly beyond the screws 4 is at least equal to or but slightly less than the distance that the screws 4 can slide in the slots $2^c$.

In using my improvements the lips 3 may be secured in position upon the cap and projected outwardly therefrom, as shown in Fig. 2, and then the cap may be placed over the conduit and the covers slid close to or in contact with the lugs or projections $2^b$ of the cap, so that the covers will be over the lips or projections, whereby the cap will be held by the cover upon the conduit. When it is desired to remove the cap or fitting without moving the covers the lips or strips may be slid back from under the cover by suitably loosening the screws 4, and then the cap may be removed to permit access to the fittings within etc., and when the cap is to be replaced it is applied over the conduit between the adjacent ends of the covers and the screws 4 and lips 3 are moved outwardly to carry said lips under the ends of the covers, and the screws then fastened in place.

By the procedure above mentioned the positions of the cover with respect to the cap upon the conduit may readily be determined.

If preferred, however, when first applying the cap to the conduit the strips or lips 3 may be retracted, the cap placed over the conduit and the covers pushed up to the cap, and then the lips may be moved outwardly and secured by the screws.

The device shown is in the form of a receptacle, in which the base is indicated at 5 and which may be of insulating material, such as porcelain, and the cap overlies the base in well known manner, the base being provided with any suitable electrical connections, indicated generally at 6, 7.

Having now described my invention what I claim is:—

1. The combination of a cap, a lip adapted to be adjusted in the general direction of the length of the cap, and means for adjustably holding said lip upon the cap.

2. The combination of a cap provided with a slot extending in the general direction of the length of the cap, a lip, and a screw passing through said slot and engaging said lip for adjustably holding the lip upon the cap.

3. The combination of a cap having a projection to enter the conduit and having a slot passing through said projection and extending in the general direction of the length of the cap, a lip in line with said projection, and a screw passing through said slot and engaging the lip.

4. The combination of a cap having a socket on its under surface extending in the general direction thereof, a lip mounted to slide in said socket, and means for adjustably holding the lip upon the cap to enable the lip to be projected beyond and withdrawn under the cap for holding the cap upon a conduit.

5. The combination of a cap having a socket on its under surface and extending in the general direction thereof, a lip mounted to slide in said socket, said cap having a slot communicating with said socket, and a screw located in said slot and entering a threaded aperture in the lip, whereby the lip may be projected beyond and drawn under the cap for holding the cap upon a conduit.

6. A device of the character described comprising a cap provided with a gain, a lip, and means for adjustably supporting the lip so that it may be projected beyond the cap and withdrawn thereunder, and means to prevent rotation of the lip.

7. A device of the character described comprising a cap having a gain in its under surface to receive a conduit, a lip in line with said gain, and means for adjustably supporting said lip upon the cap so that it may be projected beyond and withdrawn under the cap, and means to prevent rotation of the lip.

8. A device of the character described comprising a cap made of insulating material and provided with a slot extending lengthwise thereof, a lip, and a screw located in said slot and engaging the lip, whereby the lip may be projected beyond the cap and held in such position and may be withdrawn under the cap for holding the cap upon a conduit.

GEO. A. LUTZ.

Witnesses:
T. F. BOURNE,
J. A. GRAVES.